United States Patent [19]

Dragisich

[11] Patent Number: 5,286,464
[45] Date of Patent: Feb. 15, 1994

[54] SILICA GEL ION EXCHANGE RESINS FOR THE SELECTIVE REMOVAL OF LEAD AND CADMIUM IONS FROM AQUEOUS LIQUIDS

[75] Inventor: Vera Dragisich, Lisle, Ill.

[73] Assignee: Nalco Chemical Company, Naperville, Ill.

[21] Appl. No.: 75,380

[22] Filed: Jun. 14, 1993

[51] Int. Cl.$^5$ .................. C01G 21/00; C22B 13/00; C22B 17/00; C02F 1/42
[52] U.S. Cl. .................. 423/89; 423/100; 210/670; 210/688; 210/912
[58] Field of Search .................. 423/89, 100; 210/670, 210/688, 912; 502/407

[56] References Cited

U.S. PATENT DOCUMENTS

| | | | |
|---|---|---|---|
| 4,203,952 | 5/1980 | Hancock et al. | 423/100 |
| 4,377,555 | 3/1983 | Hancock et al. | 210/688 |
| 4,448,694 | 5/1984 | Plueddemann | 210/688 |
| 5,035,803 | 7/1991 | Cohen | 502/407 |
| 5,053,139 | 8/1991 | Dodwell et al. | 210/912 |
| 5,078,978 | 1/1992 | Tarbet et al. | 423/22 |
| 5,134,110 | 7/1992 | Sudo et al. | 502/407 |

OTHER PUBLICATIONS

Ginsberg, T., et al, "Corrosion-protective mixture for ferrous metals," Abstract of Ger. patent DE 2,821,016, Nov. 16, 1978, Chem. Abstract #90(16)125680m.

Penneck, R. J., "Ethylene polymer-modified silica adhesives" Abstract of Ger. patent DE 2,321,333, Nov. 15, 1973, Chem. Abstract #80(22)121786w.

CA109 (22): 192594k, Chemical Abstracts Service, 1988.

CA113 (18): 154253y, Chemical Abstracts Service, 1990.

Primary Examiner—Wayne Langel
Assistant Examiner—Steven Bos
Attorney, Agent, or Firm—Robert A. Miller; John G. Premo

[57] ABSTRACT

Lead and cadmium ions are selectively removed and reclaimed from aqueous liquids containing the ions of these metals using an ion exchange resin which comprises a modified silica gel.

9 Claims, 2 Drawing Sheets

SILICA GEL ION EXCHANGE RESINS FOR THE SELECTIVE REMOVAL OF LEAD AND CADMIUM IONS FROM AQUEOUS LIQUIDS

FIELD OF THE INVENTION

The use of ion exchange to remove lead and cadmium from aqueous liquids containing ions of these metals.

INTRODUCTION

Metal separation and recovery is an important part of a water reuse program. Traditional metal removal technologies do not take advantage of the potential value of the metals which are conventionally disposed of as sludge. As environmental regulations become more stringent and disposal becomes more expensive, metal selective removal technologies coupled with potential metal reuse will become more important.

Ion exchange media provide a versatile method for metal removal and recovery. However, only a limited number of functional groups are currently available as ion exchange resins. Many metal recovery problems can not be solved using these resins due to lack of selectivity. Ion exchangers with new functional groups are needed to solve the ever increasing number of wastewater problems.

THE INVENTION

Figure 1:
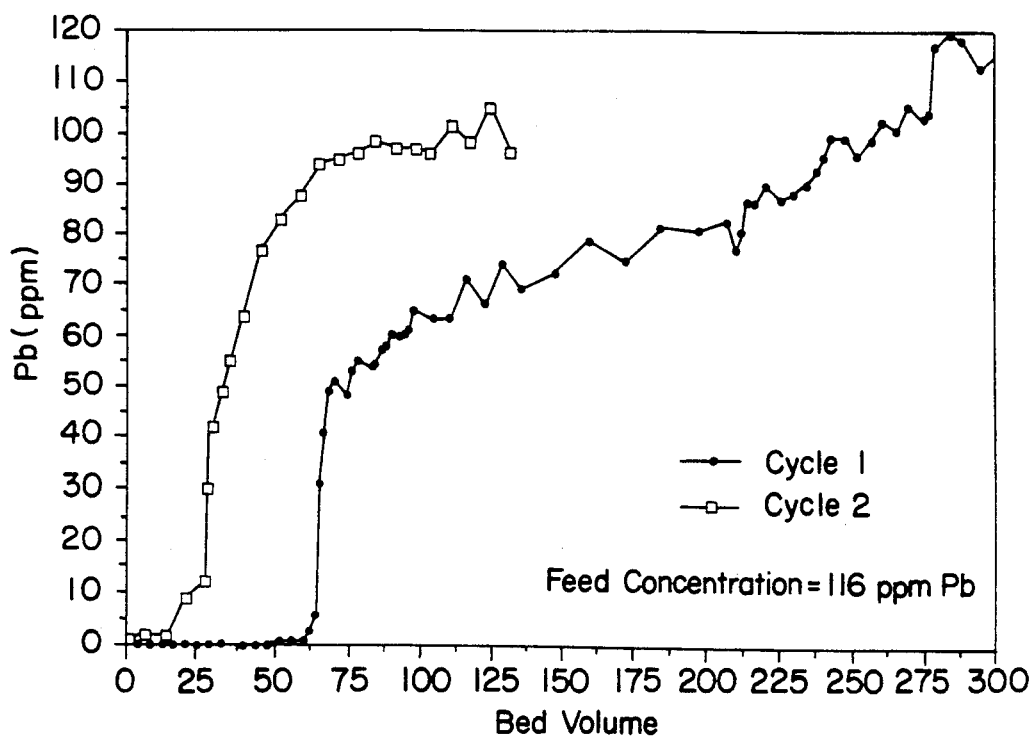
FIG. 1 shows breakthrough curves for Bis(2-hydroxyethyl)-3-aminopropyltriethoxysilane functionalized silica gel.

The invention comprises an ion exchange process to selectively remove the metals, lead and or cadmium, from aqueous liquids containing the ions of these metals. These liquids are contacted with an ion exchange resin for a period of time sufficient for the ion exchange resin to complex with the lead and or cadmium ions in the aqueous liquids and then, the complexed resin is regenerated, to remove and recover the lead and or the cadmium. The ion exchange resin may then be reused.

The invention resides in using as the ion exchange resin an amorphous silica gel having a surface area of at least $100M^2/g$ having at least 10% of its surface silanol groups reacted with a triethoxy silane from the group consisting of Bis(2-hydroxyethyl)-3-aminopropyltriethoxysilane and N-[3-(triethoxysilyl)propyl]-4,5-dihydroimidazole. This is an improvement over prior art ion exchange processes.

THE STARTING SILICA GELS

Silica gels are modified with either Bis(2-hydroxyethyl)-3-aminopropyltriethoxysilane or N-[3-(triethoxysilyl)propyl]-4,5-dihydroimidazole to prepare amorphous non-crystalline silicas having a surface area of at least $100M^2/g$ and at least 10% of their surface silanol groups reacted with the Bis(2-hydroxy ethyl)-3-aminopropyltriethoxysilane and/or N-[3 -(triethoxysilyl)propyl]-4,5-dihydroimidazole. In a preferred embodiment of the invention, the surface area of the amorphous silica gels should be in excess of $500M^2/g$. In a more preferred embodiment of the invention, the surface area is in excess of $600M^2/g$. A preferred amorphous silica gel is sold under the trade name Davidson Grade 40 Silica Gel (6-12 mesh). This material has a pore volume of 0.43 cc/g. It has a surface area of $720-760M^2/g$. The silica gels may be either precipitated silica gels or those made by the high temperature hydrolysis of silicantetrachloride. Another form of amorphous silica gel that may be used are the so called aerogels.

Since the silica gels are used to provide ion exchange resins, it is obvious to those skilled to the art that the aggregate particle size of the silica gel must be within the particle size range normally associated with ion exchange resins when they are used in column operations. The finer silica gels can be used when batch or slurry operations are conducted for the purposes of metal removal.

SYNTHESIS OF THE FUNCTIONALIZED SILICA GEL

Davidson Grade 40 silica gel (6-12 mesh, 100 g) was placed in a 3 L three-neck round bottom flask equipped with a condenser, a thermocouple, and a mechanical stirrer. HCl (2M, 400 ml) was added and the slurry stirred for 30 minutes at 50° C. The activated silica gel was washed with deionized water until the pH of the wastewater was greater than 6. The silica gel was then suspended in deionized water (1500 ml) and heated to 75° C. Bis(2-hydroxyethyl)-3-aminopropyltriethoxysilane (250 ml) was slowly dripped into the slurry over a 2 hour period. After addition of the silane, the solution was stirred at 75° C. for 1 hour. The liquid was decanted from the silica gel and 1M NaOH (500 ml) added and stirred for 5 minutes. The silica gel was washed with deionized water (3 x) and collected on a Buchner funnel. The functionalized silica gel was dried in a vacuum oven at 100° C. for 2 hours.

Dihydroimidazole functionalized silica gel was synthesized by adding N-[3-(triethoxysilyl)propyl]-4,5-dihydroimidazole to silica gel in the same manner as above.

EVALUATION OF THE INVENTION

Preparation of Metal Solutions

Solutions of approximately 100 ppm metal were prepared by dissolving the metal nitrates of Zn(II), Cu(II), Ni(II), Pb(II), Cd(II), and Co(II) in deionized water.

Static Test Evaluations

The silica gel (0.1 g) was placed in a jar and to each jar was added a metal solution (10 ml) consisting of approximately 100 ppm of one of the above mentioned metals. The jars were agitated for 1 hour. After 12 hours the solutions were filtered (0.45 micron), diluted as necessary, and analyzed for remaining metal with a Perkin-Elmer Model P40 Inductively Coupled Argon Plasma (ICP) Spectrophotometer.

Column Test Evaluations

A column with an internal diameter of 11 mm and length of 30 cm was loaded with 20 ml of silica gel. A solution of 100 ppm lead was passed downward through the column until effluent lead concentration was equal to influent lead concentration. The flow rate of the solution was 1 bed volume per hour (BV/hr). Samples were collected using a fraction collector, and then analyzed for lead concentration using ICP. The columns were then regenerated with 2M HCl until all the lead was removed. During regeneration, samples were collected and analyzed for lead concentration by ICP.

After regeneration and before the start of the next cycle, the bishydroxyethylamine functionalized silica gel column was treated with pH=5 buffer for 3 BV, and the dihydroimidazole functionalized silica gel column was treated with 3 BV of 0.01M Borax ($Na_2B_4O_7 \cdot 10H_2O$).

EXAMPLE 1

Functionalized Silica Gel For Lead Removal

The bis(2-hydroxyethyl)-3-aminopropyltriethoxysilane functionalized silica gel was evaluated for its ability to remove various divalent metals (lead, copper, zinc, cadmium, nickel, and cobalt) using the static test described above.

Results indicated that bishydroxyethylamine functionalized silica gel was excellent for lead removal (98%) and very good for cadmium removal (88%). Copper removal was fair at 56% and zinc, nickel, and cobalt removals were poor at approximately 30%.

Lead and cadmium have the largest radii at 1.20 and 0.97 angstroms respectively, while the remaining metals have smaller radii at approximately 0.7 angstoms. An explanation for the excellent lead and cadmium removal of bishydroxyethylamine functionalized silica gel may lie in the size of the atomic radii. Lead and cadmium are both large and may be the appropriate size to fit in the cavity created by the two hydroxyethyl groups on the nitrogen. However, ionic effects from the oxygens, as well as chelating effects from the nitrogen on the functional group, may also have an effect on the metal removal ability.

Dihydroimidazole functionalized silica gel was evaluated for its ability to remove various metals in their divalent states (lead, copper, zinc, cadmium, nickel, and cobalt) using static tests. The results indicated that dihydroimidazole functionalized silica gel can remove lead to a greater degree (95%) than copper and cadmium (60%), and to a much greater degree than zinc, nickel, and cobalt (30%).

Static tests were also run to determine if unmodified silica gel, (without any functional groups), would remove lead and cadmium ions. As shown in Table I unfunctionalized silica gel will remove some metal, but nowhere near the amount of metal that is removed when the silica gel is functionalized. The bishydroxyethylamine functionalized silica gel will remove approximately 70% more lead or cadmium than silica gel alone, and the dihydroimidazole functionalized silica gel will remove approximately 50% more metal than unfunctionalized silica gel.

TABLE 1

| Media | Metal | % Metal Removed |
| --- | --- | --- |
| UFSG | Lead | 37% |
| BHEA | Lead | 98% |
| DHI | Lead | 95% |
| UFSG | Cadmium | 14% |
| BHEA | Cadmium | 88% |

TABLE 1-continued

| Media | Metal | % Metal Removed |
| --- | --- | --- |
| DHI | Cadmium | 58% |

UFSG = Unfunctionalized Silica Gel
BHEA = Bishydroxyethylamine Functionalized Silica Gel
DHI = Dihydroimidazole Functionalized Silica Gel

EXAMPLE 2

Column Studies with
Bis(2-hydroxyethyl)-3-aminopropyltriethoxysilane
Functionalized Silica Gel Two cycles of loading and regeneration were run. Breakthrough curves are shown in FIG. 1. The capacity was 8 mg lead/ml silica. In Cycle 1, lead leakage did not occur until approximately 75 bed volume (BV); however, lead leakage occurred at approximately 25 BV in Cycle 2.

Figure 2:
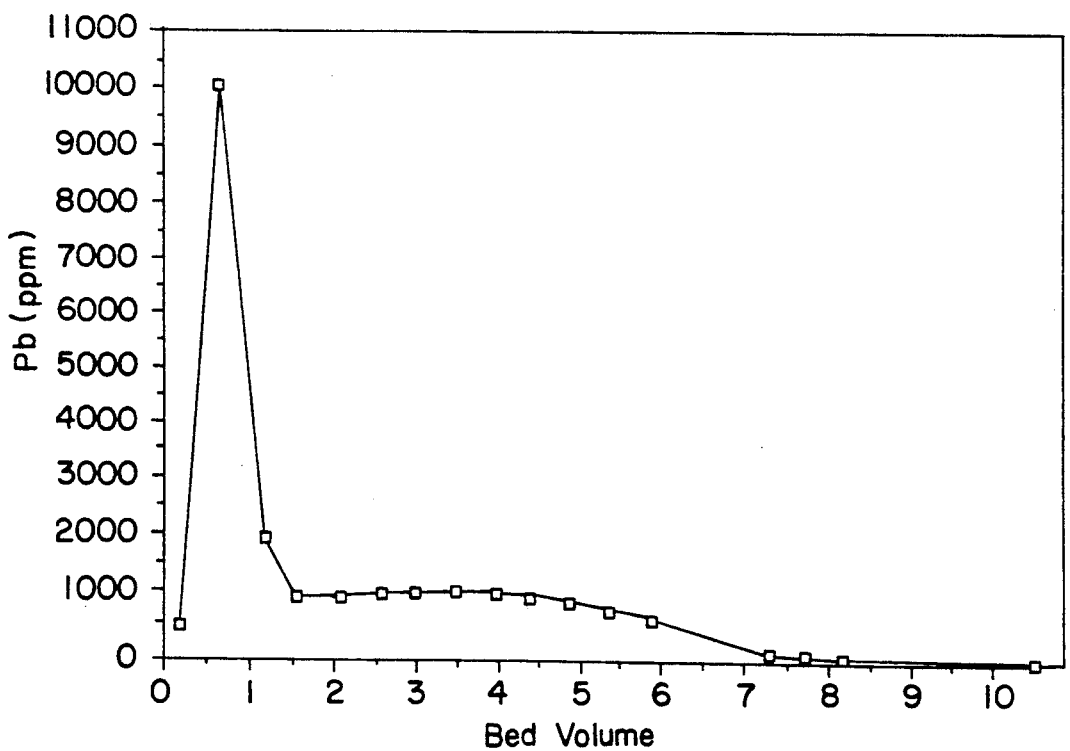
FIG. 2 shows the regeneration of Bis(2-hydroxyethyl)-3-aminopropyltriethoxysilane functionalized silica gel using 2M HCl.

As shown in FIG. 2, the regeneration could be achieved fairly effectively using 2M HCl. Most of the lead was removed from the column within 1.5 BV, and the remaining lead trailed off over 7 BV.

Between regeneration and the start of the next cycle, the column must be treated with pH=5 buffer for approximately 3 BV. If the pH of the column is less than 5, no lead will be removed. After regeneration with 2M HCl, the pH of the column is <3, and thus the pH of the column must be adjusted to 5 or possibly greater.

EXAMPLE 3

Figure 3:
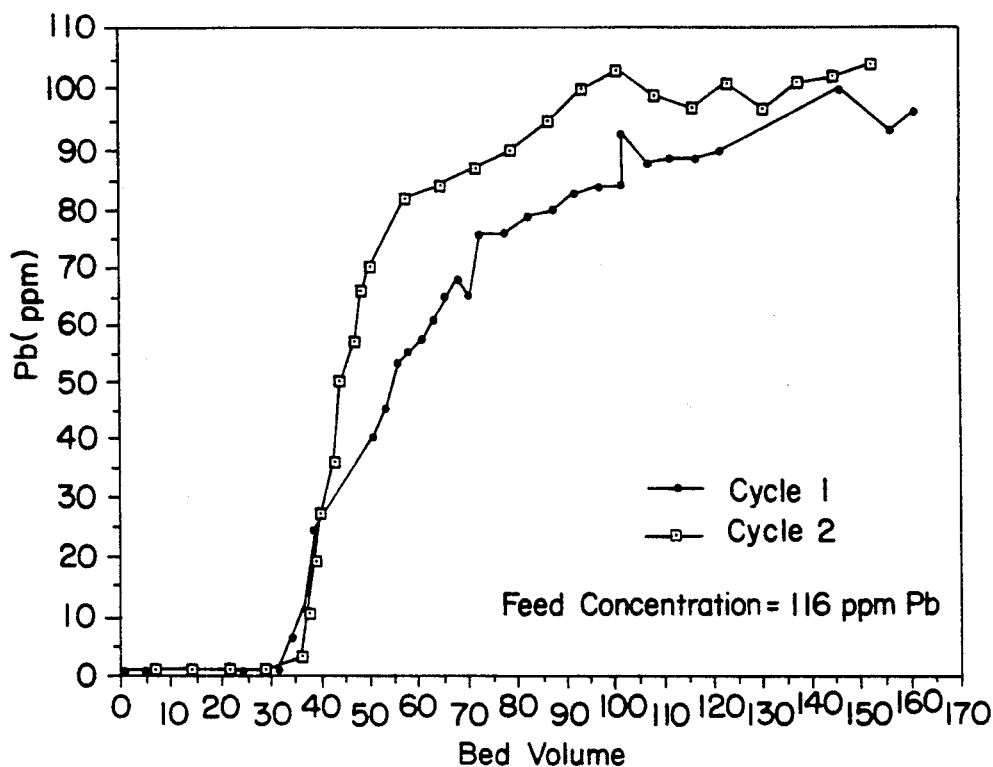
FIG. 3 shows breakthrough curves for N-[3-(triethoxysilyl) propyl]-4,5-dihydroimidazole functionalized silica gel.

Column Studies with
N-[3-(triethoxysilyl)propyl]-4,5-dihydroimidazole
Functionalized Silica Gel Two cycles of loading and regeneration were run. There was no loss in capacity between Cycle 1 and Cycle 2 as indicated in FIG. 3. The capacity was 7 mg lead/ml silica. The leakage of lead also remained the same. Leakage of lead for both cycles occurred at 40 bed volumes.

Figure 4:
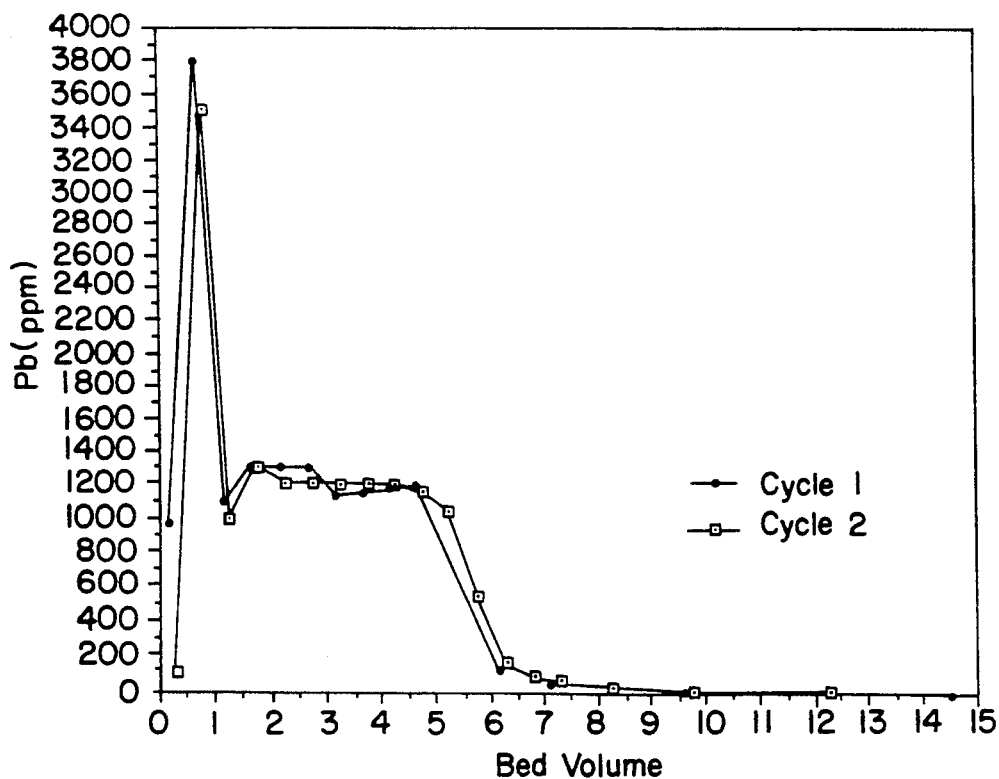
FIG. 4 shows the regeneration of N-[3-(triethoxysilyl) propyl]-4,5-dihydroimidazole functionalized silica gel using 2M HCl.

FIG. 4 shows that the regeneration with 2M HCl was fairly effective, and that the same type of regeneration pattern occurred for both cycles. The highest concentration of lead was removed within 1.5 BV of regenerant. Within 5 BV of regenerant, most of the lead had been removed, and the remaining lead came off the column by 7 BV of regenerant. The regenerant solution may then be treated to recover lead. The minimal amount of regenerant needed allows for recovery of metals in concentrated forms.

In order for lead to be removed, the column must be basic (the nitrogen on the dihydroimidazole functionality can not be protonated); however, after regeneration with 2M HCl, the column is acidic. The column must be treated with base in order to achieve proper pH, but strongly basic conditions, such as NaOH, are destructive to silica gel. Thus, the column was treated with 3 BV of 0.01M Borax ($Na_2B_4O_7 \cdot 10H_2O$) which has a pH of 9.2 at room temperature (Source: CRC, 64th Edition, p. D-151). After treatment with Borax, the column was sufficiently basic for the next cycle of lead removal.

Leakage (approximately 40 BV), capacity (approximately 7 mg lead/ml silica), and regenerability are comparatively the same in both N-[3-(triethoxysilyl)propyl]-4,5-dihydroimidazole and Bis(2-hydroxyethyl)-3-aminopropyltriethoxysilane functionalized silica gels.

I claim:

1. In an ion exchange process to selectively remove the metals, lead and cadmium, from aqueous liquids containing the ions of these metals wherein these liquids are contacted with an ion exchange resin for a period of time sufficient for the ion exchange resin to complex with the lead and cadmium ions in the aqueous liquids and then regenerating the resin to remove and recover the metals from the resin; the improvement which comprises using as the ion exchange resin an amorphous silica gel having a surface area of at least $100M^2/g$ having at least 10% of its surface silanol groups reacted with a triethoxy silane selected from the group consisting of Bis(2-hydroxyethyl)-3-aminopropyltriethoxysilane and N-[3-(triethoxysilyl)propyl]-4,5-dihydroimidazole.

2. The method of claim 1 where the amorphous silica gel has a surface area of at least $500M^2/g$.

3. The method of claim 1 where the triethoxy silane is Bis(2-hydroxyethyl)-3-aminopropyltriethoxysilane.

4. The method of claim 1 where the triethoxy silane is N-[3-(triethoxysilyl)propyl]-4,5-dihydroimidazole.

5. The method of claim 2 where the ion exchange resin is in a column.

6. The method of claim 1 where the metal is lead.

7. The method of claim 1 where the metal is cadmium.

8. The method of claim 1 where the amorphous silica gel is regenerable.

9. The method of claim 1 where the amorphous silica gel is regenerated and the metals are recovered in concentrated form.

* * * * *